Patented Mar. 30, 1926.

1,578,522

UNITED STATES PATENT OFFICE.

EDWARD C. HOLTON, OF OLMSTED FALLS, OHIO, ASSIGNOR TO THE SHERWIN-WILLIAMS COMPANY, OF CLEVELAND, OHIO, A CORPORATION OF OHIO.

INSECTICIDE-FUNGICIDE AND PROCESS FOR MAKING THE SAME.

No Drawing. Application filed January 12, 1925. Serial No. 1,737.

*To all whom it may concern:*

Be it known that I, EDWARD C. HOLTON, a citizen of the United States, and a resident of Olmsted Falls, county of Cuyahoga, State of Ohio, have invented certain new and useful Improvements in Insecticide-Fungicide and Processes for Making the Same, of which the following is a specification.

This invention relates to an improved form of insecticide and fungicide and process for making same.

The consumption of insecticides today is vastly greater than it was a few years ago, yet it hardly keeps pace with the increase in insect infestation. Heretofore arsenic has been one of the principal substances used as an insecticide and the demand for this material has become so great that there is a possibility that the world's supply will become inadequate to cope with the situation.

Comparable to the losses caused by insects are those caused by fungi and it has become quite general practice to mix various insecticides and fungicides in an attempt to check both of these evils in one application. Sometimes the mixtures which have been heretofore used have given good results and at other times undesirable reactions have taken place which cause burning of the foliage and fruit, and even the loss of the insecticide before it has accomplished its mission. It is an object of this invention to produce a combined insecticide-fungicide which not only possesses great efficiency in itself, but may be mixed in any desired proportions, with the arsenical insecticides without any disastrous results. It is also an object of the invention to provide an effective substitute for arsenic, for these purposes, that will relieve the strain on that most useful commodity.

It has long been known that the salts of barium possess a considerable degree of toxicity, and barium carbonate and barium chloride have been used to a considerable extent for poisoning insects and vermin. Owing to the extreme solubility of barium chloride it is unsatisfactory for general use as an insecticide, because it is usually injurious to the vegetation to which it is applied, and it is also easily washed off by rains.

The fluorides of the different elements, generally, are toxic but the fluorides of the alkalies, on account of their ready solubility in water, have not been heretofore used as insecticides and fungicides, although they are largely used as antiseptics. The fluorides of the elements of the alkaline earths group are insoluble or but slightly soluble, in water, and I have found that they are well adapted for use as insecticides and fungicides, and of these the barium compound has been preferred, for in this salt the toxicity is developed to the highest degree, probably due to the fact that both of its components are strongly toxic.

Sulfur has long been used as a fungicide, and experience has shown that the best results are attained by the use of sulfur in a state of extreme division. Sulfur may be brought into this state by mechanical means or by chemical processes or by a combination of the two. Heretofore, it has been customary to prepare finely divided, chemically precipitated sulfur by the reaction of hydrochloric or sulfuric acids on alkaline polysulfids. Also, solutions of hydrogen sulfid and sulfur dioxide, may be caused to react or a reaction may take place in the gaseous phase. These reactions have been well known and utilized in various industries for many years. Sulfur, prepared by such methods, is rather expensive for the reason that the salts, such as sodium chloride or sodium sulfate, simultaneously formed, are so diluted that they are worthless and must be removed by extensive washing, which is rather costly.

If sulfur, which has been prepared in the manner described, is to be used as a fungicide, it is best preserved in a wet state, for after it has once been dried, it is a difficult and expensive matter to convert it into a dry powder form which will possess the property of being readily wettable with water. It is one of the objects of this invention to provide an insecticide-fungicide containing the toxic elements barium, fluorine and sulfur in such form that they may be readily and conveniently packed for transportation and will be preserved in a condition in which they may be used with the maximum degree of efficiency. In my application, No. 697,712, filed March 8, 1924, I have described a method of producing a coprecipitate of sulfur and barium fluoride which will meet the conditions set forth, and in my application No. 1,738, filed Jan. 12, 1925, I have described the production of a coprecipitate of sulfur and barium silicofluoride, which has the advantage of a relatively higher fluorine content than the coprecipitate of sulfur and barium fluoride, fluorine, as above stated, possessing desirable toxic properties. It is an object of the present invention to produce a coprecipitate of sulfur and a fluoride of the alkaline earths group in which the fluorine content will be relatively higher than the coprecipitate of sulfur and barium silicofluoride.

My preferred method of practicing my invention is to first prepare an aqueous solution of calcium polysulfid, consisting mainly of the tetra and penta sulfids of calcium, commonly known as lime-sulfur. This lime-sulfur may be prepared by any of the usual processes. The solution, thus produced, is clarified by filtering and conveyed to a suitable reaction tower or vessel and hydrosilicofluoric acid, diluted with water, is gradually added thereto with proper agitation. In practice the dilute solution of hydrosilicofluoric acid will usually vary to suit the conditions and the acid content of the solution may run between three and twenty-five percent. By this reaction there is produced a coprecipitate of finely divided sulfur and calcium silicofluoride and, since the calcium silicofluoride is practically insoluble in water, there is only a very slight loss of either calcium or fluorine. A portion of the sulfur, in the lime-sulfur, passes off as hydrogen sulfid and by agitating this gas with more of the lime-sulfur, and gaseous sulfur dioxide, or an aqueous solution of sulfur dioxide, in a closed vessel provided with an agitator, or by allowing them to flow together or in counter currents in a reaction tower, or by any of the usual methods of effecting such reactions, the total sulfur in the compounds used may be obtained in a form suitable for use as a fungicide in combination with insecticidal and fungicidal calcium silicofluoride.

One specific method of practicing my invention is as follows: When the element calcium, of the alkaline earths group is used, there are several methods by which the polysulfide of the element may be formed, a specific example of which is the well-known process of making lime-sulfur solutions. In a large kettle, provided with means for heating, either by steam or an open fire of gas, coke or other fuel, 1000 gallons of water are introduced. This is heated and kept in agitation, preferably by a mechanical agitator, while 1800 pounds of lime and 3250 pounds of sulfur are being added. This mixture is kept at or near the boiling temperature for one hour, more or less, and until substantially all of the sulfur has passed into solution and the liquor, when cooled, shows a density of about 33° Bé. This liquor is clarified by settling or filtering, or both, and is then ready for use.

To each gallon of the 33° liquor, which has been diluted with water to about 3° Bé., I add approximately 3.36 pounds of 30% hydrosilicofluoric acid, diluted with ten times its volume of water. While the resulting reaction is taking place, I introduce into the reaction chamber or tower a current of sulfur dioxide to prevent the escape of hydrogen sulfide, which is a poisonous and disagreeable smelling gas. By the reaction of the sulfur dioxide with the hydrogen sulfide, water and sulfur are produced, the latter being about one-half as much as the sulfur directly precipitated without the use of sulfur dioxide. For each gallon of the 33% Bé. liquor, about seven-tenths of a pound of sulfur dioxide is required. This sulfur dioxide is an article of commerce and may be easily obtained, compressed in cylinders, or may be prepared by burning sulfur in air or by roasting sulfide ores.

The co-precipitate of sulfur and calcium silicofluoride, thus produced, is filtered and dried and pulverized and may then be used in dry dusting operations or may be mixed with water and used in liquid sprays, alone or in combination with other insecticides and fungicides. If desired, drying may be omitted and the co-precipitate may be preserved as a moist paste. The foregoing is merely an example of one method of procedure. Several modifications of this give equally good results and I do not limit myself to the exact weights and dilutions, since other weights and dilutions may be used, provided proper care is taken to abide by the principles above set forth.

The acid precipitating agent should be used in such proportion as to substantially neutralize the alkalinity of the element of the alkaline earth series and sulfur dioxide should be used in such proportion as will neutralize the hydrogen sulfide developed.

The sulfur dioxide used to recover the sulfur in the hydrogen sulfid may be prepared directly from burning sulfur, or may be drawn from cylinders of the commercial liquid sulfur dioxide.

By maintaining the proper proportions, practically all of the calcium in the lime-sulfur solution used, and practically all of the fluorine in the hydrosilicofluoric acid used, are recovered as calcium silicofluoride; and practically all of the sulfur from the lime-sulfur, together with all of the sulfur in the sulfur dioxide, is recovered as fungicidal sulfur in intimate mixture with the calcium silicofluoride, the major portion of the mixture being calcium silicofluoride and the minor portion being sulfur.

When calcium silicofluoride is coprecipitated with sulfur, in the manner described, there is a tendency for the calcium silicofluoride to assume a crypto-crystalline or amorphous form, rather than the definite crystalline form usually assumed when coming out of solution in water. This tendency may be still further augmented by adding to the liquors, before precipitation, a very small quantity of some substance such as glue or casein or gum acacia, or sulfonated castor oil or some other substance, such as is ordinarily used as a protective to prevent crystallization. Care must be exercised, however, to use the minimum quantity required, to produce the desired effect, since anything more than this amount tends to make the subsequent filtration extremely difficult. It is not possible to state in advance the exact amount of the protective substance to be used, in each instance, since this varies somewhat with the nature of the substance and the composition and concentration of the solution under treatment. However, anyone practicing this invention, readily learns under what conditions and to what extent the protective substance should be used to give a precipitate approximately amorphous, and yet readily filterable.

In practicing this invention, if it should be found that the filtration is rendered too slow or too difficult, the use of the protective substance, before filtration, may be dispensed with and some of the beneficial results sought, may be obtained by dusting the protecting, in a dry powder form, over the wet filter cake, or a solution or suspension of the protective substance may be sprinkled over the wet filter cake.

The coprecipitate of calcium silicofluoride and sulfur, produced in accordance with my invention, is a highly useful material for use as an insecticide and fungicide because of the relatively high fluorine content of the calcium silicofluoride and because the sulfur in the mixture is maintained in its most active condition so as to be at all times readily wettable with water, permitting the material to be used as a wet spray or in the dry form for dusting purposes. The calcium silicofluoride being in a substantially amorphous condition, as above described, is also in the most active form for the purposes referred to and, on account of its lightness, has very satisfactory suspension qualities which are important in using the material as a wet spray. In addition to the calcium silicofluoride and sulfur, in the mixture, there will also be traces of other compounds of the elements of the alkaline earths group, but these do not affect the efficiency of the mixture.

Having thus described my invention, what I claim is:

1. In methods for the production of a product for the purposes specified, the step which consists in reacting upon a polysulfid of calcium with hydrosilicofluoric acid for producing a coprecipitate of finely divided sulfur and calcium silicofluoride.

2. In methods for the production of a product for the purposes specified, the step which consists in reacting upon an aqueous solution of a polysulfid of calcium with hydrosilicofluoric acid, using a protective substance to prevent crystallization, and thereby producing a coprecipitate of finely divided sulfur and substantially amorphous calcium silicofluoride.

3. In methods for the production of a product for the purposes specified, the steps which consist in first preparing an aqueous solution of a polysulfid of calcium, and then mixing the same with hydrosilicofluoric acid, to produce a coprecipitate of finely divided sulfur and calcium silicofluoride.

4. In methods for the production of a product for the purposes specified, the steps which consist in first preparing an aqueous solution of a polysulfid of calcium, then clarifying the same, and then reacting upon said clarified solution with hydrosilicofluoric acid and sulfur dioxide to produce a coprecipitate of finely divided sulfur and calcium silicofluoride.

5. In methods for the production of a product for the purposes specified, the steps which consist in first preparing an aqueous solution of a polysulfid of calcium, then reacting upon the same with hydrosilicofluoric acid, and then mingling the gases evolved in said reaction with sulfur dioxide and more of said solution and thereby producing a coprecipitate of finely divided sulfur and calcium silicofluoride.

6. In methods for the production of a product for the purposes specified, the steps which consist in combining an aqueous solution of a polysulfid of an element of the alkaline earths group with hydrosilicofluoric acid and sulfur dioxide and a colloid to form a coprecipitate of a substantially amorphous silicofluoride of said element and finely divided sulfur.

7. In methods for the production of a product for the purposes specified, the steps which consist in combining an aqueous solution of a polysulfid of an element of the alkaline earths group with hydrosilicofluoric acid and sulfur dioxide and a colloid to form a coprecipitate of a substantially amorphous silicofluoride of said element and finely divided sulfur, and drying said coprecipitate in a temperature below the melting point of sulfur.

8. As a new product or article of manufacture, a mixture of finely divided sulfur and a substantially amorphous silicofluoride of an element of the alkaline earths group.

9. As a new product or article of manufacture, a mixture of finely divided sulfur and calcium silicofluoride in substantially amorphous form.

10. As a new product or article of manufacture, a dry powder consisting of a mixture of chemically precipitated sulfur and a chemically precipitated silicofluoride of an element of the alkaline earths group in substantially amorphous form.

11. As a new product or article of manufacture, for insecticidal and fungicidal purposes, a dry powdered mixture of which the major portion is a silicofluoride of an element of the alkaline earths group and the minor portion is finely divided sulfur.

12. As a new product or article of manufacture for insecticidal and fungicidal purposes, a dry powdered mixture of which the major portion is calcium silicofluoride in substantially amorphous form and the minor portion is finely divided sulfur.

In testimony whereof I affix my signature.

EDWARD C. HOLTON.